United States Patent [19]

Fischer

[11] 4,060,220
[45] Nov. 29, 1977

[54] VALVE

[75] Inventor: Josef Fischer, Underkochen, Germany

[73] Assignee: Firma Neumo Armaturenfabrik-Apparatebau-Metallgiesserei GmbH, Germany

[21] Appl. No.: 674,332

[22] Filed: Apr. 7, 1976

[30] Foreign Application Priority Data

Apr. 11, 1975 Germany .................. 7511424[U]

[51] Int. Cl.² ............................................. F16K 1/22
[52] U.S. Cl. ............................... 251/306; 251/367
[58] Field of Search .................... 251/367, 305, 306

[56] References Cited

U.S. PATENT DOCUMENTS

| 2,868,495 | 1/1959 | Lucas | 251/367 |
|---|---|---|---|
| 3,048,363 | 8/1962 | Garrigan | 251/367 |
| 3,096,072 | 7/1963 | Gulick | 251/367 |
| 3,224,729 | 12/1965 | Beurel | 251/367 |
| 3,228,653 | 1/1966 | Trimmer | 251/367 |
| 3,666,233 | 5/1972 | Scaramucci | 251/367 |
| 3,677,514 | 7/1972 | Mencarelli | 251/367 |

Primary Examiner—William R. Cline
Assistant Examiner—H. Jay Spiegel
Attorney, Agent, or Firm—J. Rodman Steele, Jr.

[57] ABSTRACT

A valve is disclosed which is comprised of a valve housing fabricated from two valve housing halves. Each half of the valve housing is comprised of a connection piece and a flange section. The connection piece is provided with means such as threads for connecting it to piping. Each flange section is constructed from stamped sheet metal and provided with an annular area forming flanges. The flange sections of each of the housing halves are fastened together by means of fasteners such as bolts. Each of the sheet metal flange sections are provided with a connection area surrounding the valve opening which is welded to one of the connection pieces forming one of the housing halves. Each sheet metal flange section is provided with at least one semicircular recess to form a shaft guide recess for a valve shaft located in the separation plane between the flange sections that run transversely to the valve opening. The valve shaft is provided with a valve flap that swivels with the valve shaft opening and closing the valve. A valve sealing ring is provided for sealing off the valve shaft and forming a valve seat. The valve sealing ring is mounted in an undercut recess of the valve housing that encircles the valve opening and is partially retained by said flange sections.

8 Claims, 3 Drawing Figures

U.S. Patent  Nov. 29, 1977  4,060,220
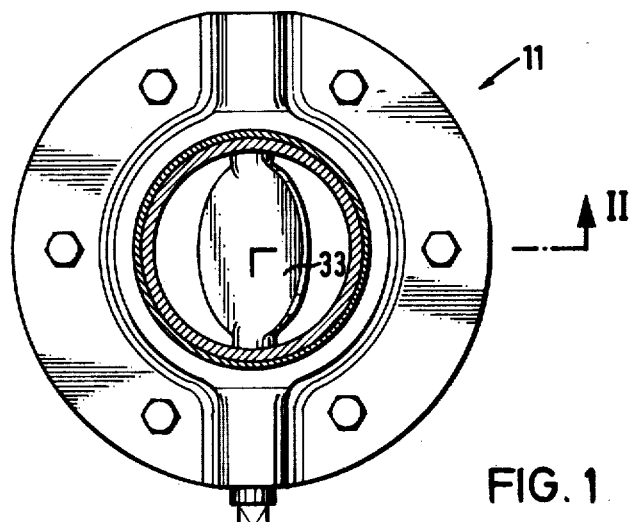
FIG. 1
FIG. 3
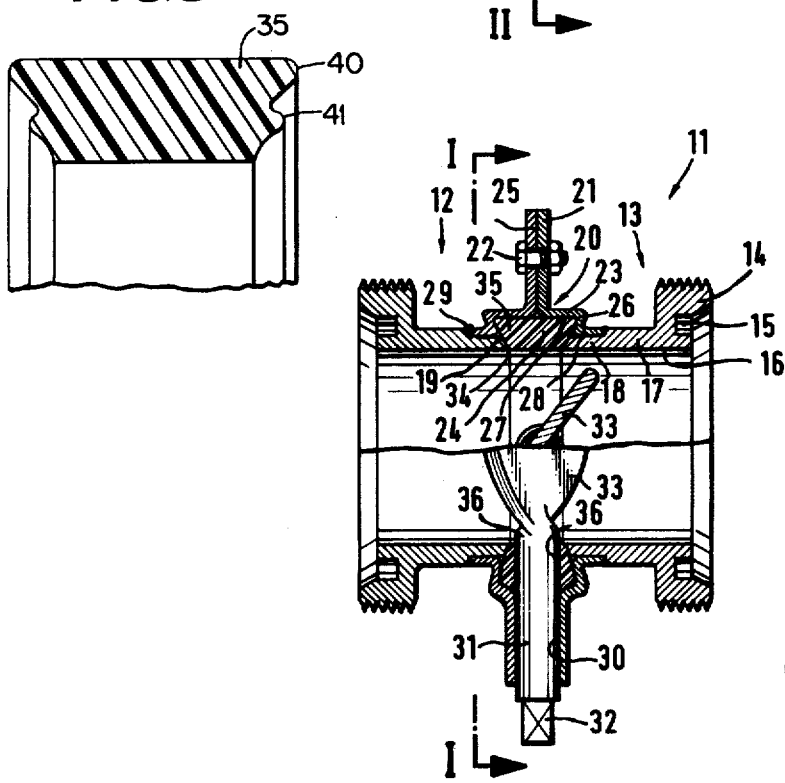
FIG. 2

VALVE

THE INVENTION AND BACKGROUND

The present invention concerns a valve with a valve housing which consists of two housing halves, each of which has a flange section which is screwed or bolted together with the other flange section and a connection piece that is welded to each flange section, and in the separation plane which runs transversely to the valve opening, one half each of the shaft guide for the valve shaft is located with a valve flap which can swivel around a shaft and with a sealing ring which seals off the valve shaft and forms the valve seat and is contained in an undercut recess of the valve housing which runs around and surrounds the valve opening.

These valves are used particularly in the food industry. They consist of two flanges which have screw connection pieces on their external surfaces which mate and are bolted together with their inside surfaces. The two flanges are normally produced as heavy turned elements, which leads to high material costs, given the use of high quality steels, which are usually necessary. The production of the semicylindrical shaft guides that run transversely to the direction of the flow not only makes necessary an additional difficult metal cutting operation, but also necessitates that the flanges have quite a heavy thickness.

In order to reduce the material consumption of high quality steel, it has already been suggested that the two housing halves, each consisting of a flange section and a connection piece section, be welded together, but otherwise they are produced from heavy turned pieces in the traditional way. To be sure, a considerable quantity of material and roughing work on the lathe is saved by doing this, but otherwise the extent of the metal cutting work is hardly reduced. In addition, there is still an inside processing of the weld seam, which extends almost into the valve opening.

The object of the invention is to create a valve of this type which can be produced with a considerably lower consumption of material and less metal cutting work.

This object has been solved in accordance with the invention in that the flange sections each consist of a stamped sheet element which has an angular area that forms the flanges in which the shaft guide recesses are formed and a connection piece area surrounding the valve opening that is welded to the connection pieces.

The advantages of the valve in accordance with the invention are the uncomplicated production with a low use of metal cutting processing. The entire flange section can be punched out of and stamped from a sheet practically without any subsequent metal cutting work. The saving of material is considerable. For example, the flange section of a valve with a rated width of 50 mm, which previously consisted of approximately 15 mm of heavy massive material, is now produced from sheet metal approximately 2.5 mm thick without the stability of the valve suffering from this. In all, it is possible to reduce the weight of a valve to a quarter of the previous weight, the saving in material being possible even greater, since there is hardly any waste in the course of production in the case of the valve in accordance with the invention.

Preferably half of the surrounding recess which carries the seal can be formed between the annular area and the connection piece area of the flange section. It can be recognized that the simple and material-saving production is aided by this measure. On account of this recess, the flange had to be relatively thick in the case of the previous valves in order to be able to cut in the recess sufficiently deeply. The design as an annular stamping adjacent to the annular area not only provides for an additional reinforcement of the flange section, but also for a good connection of the shaft guide recesses to this recess. It is advantageous for the stamping that forms the recess to be designed undercut. This undercutting is necessary in order to hold the sealing ring, on which considerable forces act during the operation of the valve. While this undercutting previously had to be produced by cutting in while working on the lathe, it can now be formed in the course of the stamping without additional effort.

In the case of an advantageous form of embodiment of the invention, the connection piece area of the flange section can be placed over an element of the connection piece and welded on the outside periphery. When this is done, it is preferable that the portion of the connection piece over which the connection area of the flange section is placed be designed as a thin walled tube projection of the connection piece. The tube projection can cover the weld seam inside. By means of this manner of connection of the two elements to form a valve housing, one provides not only for a perfect centering of the two parts welded to each other, but in addition, the inside wall of the valve opening remains completely smooth as well and therefore does not need to be reworked. In addition, in this way, the difference in diameter between the thin walled sheet of the stamped elements and the usually thicker walled connection pieces can be bridged advantageously in that the wall thickness of the connection piece at the point of welding is advantageously as large as the wall thickness of the pipe projection plus the wall thickness of the sheet which forms the flange section. An additional advantageous characteristic consists in the fact that the end of the pipe projection extends in the area of the recess and forms an edge which constricts the recess toward the valve opening. Thus, this edge forms the continuation of the undercutting which has already been provided in the course of the stamping. At the transition from the boundaries of the recess to the annularly shaped connection piece area, the sheet is formed with as low a bending radius as possible without the sealing ring lying free at the front edges of its internal side facing the valve opening. In this way, not only are flow losses avoided, but also points of attack for tearing out the sealing ring. In addition, points for the collection of contaminants are avoided by means of this particularly smooth opening hole, something which should be avoided unconditionally in the case of use in the food industry as foci for bacteria.

BRIEF DESCRIPTION OF THE DRAWINGS

For the purpose of illustrating the invention, there are shown in the drawings forms which are presently preferred, it being understood, however, that this invention is not limited to the precise arrangements and instrumentalities shown.

FIG. 1 shows a side view of a valve in accordance with the invention seen in the axial direction and cut along the line I—I of FIG. 2, FIG. 2 shows a cross section along the bent cut line II—II in FIG. 1 and FIG. 3 shows an enlarged partial cross-section through a modified form of an annular seal.

DETAILED DESCRIPTION OF THE PREFERRED EMBODIMENTS

The valve 11 shown in the drawing has two identical housing halves 12 and 13 which can be fastened to each other in an axial direction in a position displaced by 180° from each other by means of bolts or other suitable fasteners. Each housing half has a connection piece 14 which can be connected to a pipe line by means of a screw collar which is not shown and a seal which is placed in a groove 15 on the end. The connection piece surrounds the valve opening 16, which runs through the valve straight and without any essential constrictions or widenings. The connection piece has, adjacent to its threaded region, a tube shaped shank section 17 which is turned down to a lesser diameter towards its end and thereby forms a tube projection 18, the front end 19 of which is beveled off in such a way that a projecting inside edge is formed. The connection piece 14 can be a standardized part which is merely turned down in order to form the tube projection 18.

A flange section 20 is welded to the connection piece 14 of each housing half. This flange section is a stamped sheet part which, like all of the parts except for the sealing ring which is yet to be described, is produced from stainless steel. It has an annular area 21 which forms a flange in which holes are punched through which the screws or bolts 22 extend and in this way hold the two housing halves together. A stamping 23 is formed toward the inside adjacent to the annular area and a section 26 adjacent to this and running essentially radially, but in a direction to the separation plane 25 between the housing halves. An undercut circular recess 27 is formed by this stamping and which, as can be seen from FIG. 2, is undercut in a dovetailed fashion in the connected state of the two housing halves.

A connection area piece 28 running axially again, that is, tube shaped, connects to the stamping 23, fits with respect to its inside diameter on the outside diameter of the pipe projection 18 and is placed on this projection. Its outside end is welded by means of a weld 29 in the area of the connection between the pipe projection and the shank element of the connection area piece. The outside diameter of the connection area piece 28 corresponds to the outside diameter of the shank section 17 so that not only the wall of the inside valve opening, but also the outside wall in the area of the weld 29 transforms without a break from the connection piece to the connection area of the flange section.

As can be seen from FIG. 1 and the lower portion of FIG. 2, diametrically running stampings are provided in the annular area of the flange section which form semicylindrical recesses pointing toward the separation plane 25 at two opposing points of the annular area and which, when the two annular areas are bolted to each other form an essentially cylindrical shaft support for a valve shaft 31, which has a square end on one side for the connection of a valve actuation lever which is not shown and is connected integrally to a valve flap 33 in the region of the valve opening. The valve flap is designed as a circular disc like a throttle flap type and operates with its outside periphery together with the inside surface 34 of an annular seal 35 which is somewhat wider at its outside periphery than at its inside periphery so that it adapts itself to the undercutting of the circular recess 27. It can be seen that this annular seal is secured in the undercut recess against pulling out toward the inside, the ends 19 of the pipe projections of the two housing halves 12 and 13, which project axially into the circular recess 27 in the direction of the separation plane, particularly forming a continuation of this inside constriction which holds the seal. In addition, due to their beveled design, these ends also form a transition without a gap between the valve opening and the inside surface 34 of the annular seal. The annular seal does not act merely together with the valve flap 33 for the creation of a valve seat, but also has radially running opposing openings 36 through which the valve shaft 31 extends sealed.

The flange section 20 is produced from a sheet from which a ring with the bolt or screw holes are punched. The stamping process for the production of the stampings 23 and 30 and of the connection piece area 28 is accomplished on presses in the usual way without cutting.

Production of the flanges secions from stainless steel is preferred, but other metal sheet and even flat plastic material can be used. In FIG. 3 there is shown a cross-section through the particularly preferred embodiment of the sealing ring 35 which is designed in such a way that it is suited to the shape of the recess, particularly with respect to the lateral groove which occurs between the pipe projection and the bend between the sections 26 and 28 on both sides of the recess 27. The surrounding ribs 40 and 41 to be provided for this purpose on the sealing ring provide for an additional good hold of the sealing ring.

The present invention may be embodied in other specific forms without departing from the spirit or essential attributes thereof and, accordingly, reference should be made to the appended claims rather than to the foregoing specification as indicating the scope of the invention.

I claim:

1. A valve, comprising:
a valve housing comprising two valve housing halves, each of said valve housing halves being comprised of a connection piece and a flange section, said flange section being constructed from stamped sheet material and provided with an annular area forming flanges, said flange sections of each of said housing halves being fastened together by detachable fasteners, each of said sheet material flange sections having a connection area surrounding a valve opening which is welded to one of said connection pieces forming one of said housing halves;

each sheet material flange section being provided with at least one semi-circular recess to form a shaft guide recess for a valve shaft, located in the separation plane between the flange sections, that runs transversely to the valve opening, said valve shaft being provided with a valve flap that swivels with the valve shaft; and an integral valve sealing ring penetrated by the valve shaft for sealing off the valve shaft and forming a valve seat for said valve flap, said valve sealing ring being mounted in an undercut recess of the valve housing that encircles the valve opening and is partially retained by said flange sections.

2. A valve in accordance with claim 1 wherein said fasteners for fastening together the flange sections of each of said housing halves are threaded bolts.

3. A valve in accordance with claim 1 wherein one half of each of the undercut recesses (27) is made as a stamping formed between the annular area (21) and the connection area (28) of each flange section (20).

4. A valve in accordance with claim 1 wherein the connection area of the flange section is placed over a portion of the connection piece and welded on the outside periphery of the connection piece.

5. A valve in accordance with claim 4 wherein the portion of the connection piece over which the connection area of the flange section is placed is designed as a thin walled pipe projection of the connection piece.

6. A valve in accordance with claim 5 wherein the pipe projection covers the weld seam with respect to the inside of the valve.

7. A valve in accordance with claim 4 wherein the end of said pipe projection projects into the area of the undercut recess and forms an edge which constricts the recess toward the valve opening.

8. A valve in accordance with claim 7 wherein the valve sealing ring is provided with ribs on its flat lateral surfaces which come to rest against corresponding lateral grooves within the walls of the undercut recess between said flange section and said pipe projection.

* * * * *